(12) United States Patent
Mizuno (10) Patent No.: US 8,799,958 B2
(45) Date of Patent: Aug. 5, 2014

(54) VIDEO PROCESSING APPARATUS AND METHOD OF CONTROLLING THE SAME

(75) Inventor: Shogo Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 12/753,645

(22) Filed: Apr. 2, 2010

(65) Prior Publication Data

US 2010/0262993 A1    Oct. 14, 2010

(30) Foreign Application Priority Data

Apr. 8, 2009   (JP) .................................. 2009-094098

(51) Int. Cl.
   *G06F 3/00*        (2006.01)
   *G06F 13/00*       (2006.01)
   *H04N 5/445*       (2011.01)

(52) U.S. Cl.
   USPC ................... 725/52; 725/37; 725/38; 725/59; 725/60; 725/61; 348/734

(58) Field of Classification Search
   USPC ............ 725/38, 52, 59–61, 37; 345/156–169, 345/172
   See application file for complete search history.

(56) References Cited

U.S. PATENT DOCUMENTS

| 5,371,553 A | * | 12/1994 | Kawamura et al. ............. 725/59 |
| 5,554,980 A | * | 9/1996 | Hashimoto et al. ........... 345/158 |
| 5,933,141 A | * | 8/1999 | Smith ............................. 725/39 |
| 6,313,880 B1 | * | 11/2001 | Smyers et al. ................ 348/552 |

FOREIGN PATENT DOCUMENTS

JP   2008-104505 A   5/2008

* cited by examiner

*Primary Examiner* — Pankaj Kumar
*Assistant Examiner* — Alazar Tilahun
(74) *Attorney, Agent, or Firm* — Canon USA, Inc., IP Division (57) ABSTRACT

A video processing apparatus is provided that is controlled such that the display position of a cursor for a pointing type remote controller does not change when input is switched in a configuration where the video processing apparatus is connected to an external video apparatus. When input video data is switched, a controller transmits position information regarding the display position of a cursor image to the external video apparatus via a communication unit. The controller receives cursor image data generated by the external video apparatus from the external video apparatus and causes a cursor image, based on the cursor image data, to be displayed on a display unit, such that a cursor image after the input video data is switched is displayed at a position corresponding to the display position of a cursor image that has been displayed before the input video data is switched.

10 Claims, 10 Drawing Sheets

VIDEO PROCESSING APPARATUS AND METHOD OF CONTROLLING THE SAME

BACKGROUND OF THE INVENTION

1. Field of the Invention

The present invention relates to a display control apparatus remotely controlled by displaying a cursor using a pointing device, and a method of controlling the apparatus.

2. Description of the Related Art

It is known that in a composite system constituted by a television apparatus and a connected external video apparatus such as a video recorder or a game console, both the television apparatus and the external video apparatus are controllable by using a remote controller of either the television apparatus or the external video apparatus.

Japanese Patent Laid-Open No. 2008-104505 discloses a display system which allows the remote controller of a television apparatus or the controller of a game console to control both of the television apparatus and the game console by connecting them using an HDMI cable and communicating CEC commands between them.

At the same time, pointing type remote controllers have become increasingly used instead of conventional button type remote controllers. The operation of a composite system using a pointing type remote controller is performed by operating a cursor for controlling a television apparatus or an external video apparatus displayed on each display screen through an input switching operation.

However, the display position of a cursor on a display screen has been determined separately by the television apparatus side and the external video apparatus side in existing systems. Hence, when the input is switched from a television apparatus screen to an external video apparatus screen, the position of a cursor after the switching is different from that before the switching, with no relationship therebetween. This often results in a user being unable to find the cursor after switching of the input, thereby lowering the operability and usefulness of switching between the television apparatus screen and the external video apparatus screen when using cursor-based pointing type remote controllers.

SUMMARY OF THE INVENTION

The present invention provides an apparatus and a method for video processing that offers user-friendly operability in the operation of a cursor using a pointing type remote controller by controlling the position of the cursor at the input switching.

The present invention provides a video processing apparatus connected via a communication unit to an external video apparatus operable using a pointing type remote controller, the video processing apparatus is operable using the pointing type remote controller, where the video processing apparatus includes: a controller configured to display a cursor image at a specified position on a display screen of a display unit in accordance with an operation of the pointing type remote controller; and an input unit configured to receive input video data including first video data output from the external video apparatus and second video data output from a video source not including the external video apparatus. When the input video data is switched from the second video data to the first video data, the controller transmits first position information regarding the specified position of the cursor image to the external video apparatus via the communication unit, receives from the external video apparatus the first video data which has been synthesized with first cursor image data generated by the external video apparatus on the basis of the first position information such that the cursor image after the input video data is switched is displayed at a position corresponding to a display position of a cursor image that has been displayed before the input video data is switched, and causes a video image including the cursor image to be displayed on the display unit on the basis of the first video data received from the external video apparatus.

Further features of the present invention will become apparent from the following description of exemplary embodiments with reference to the attached drawings.

DESCRIPTION OF THE EMBODIMENTS

Hereinafter, embodiments of the present invention are described with reference to the drawings.

First Embodiment

Figure 1:
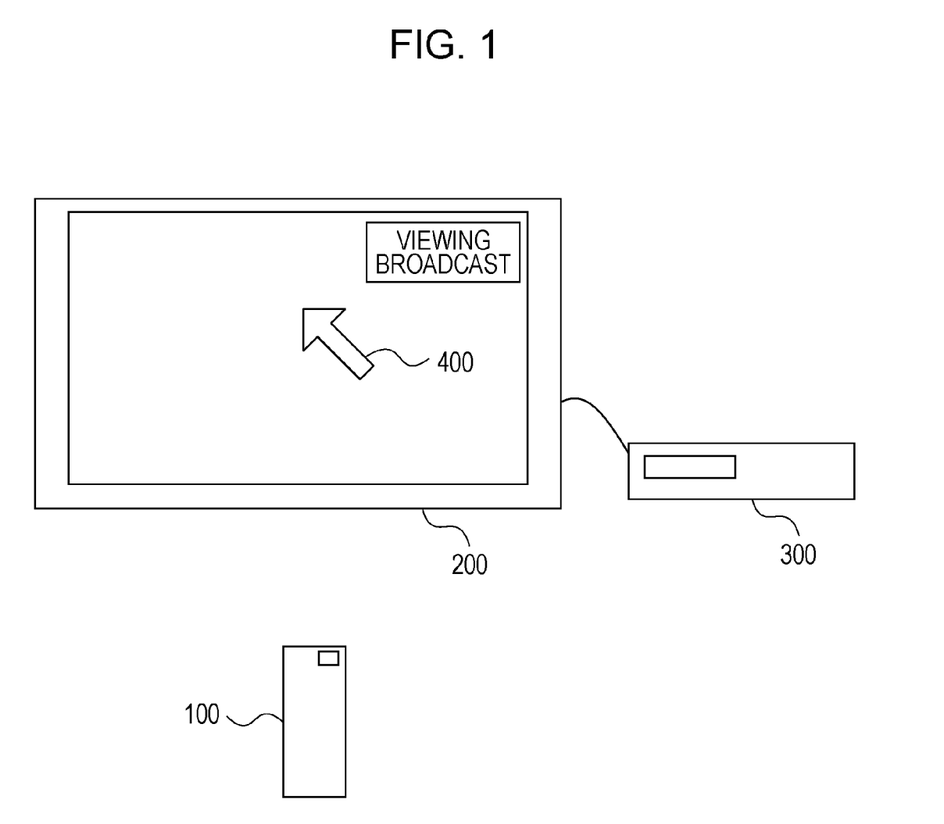
FIG. 1 is a conceptual diagram of a video control system according to the present invention.

FIG. 1 is a conceptual diagram illustrating a video control system according to the present invention. A television apparatus 200, which is a video processing unit, is connected to a video recorder 300, which is an external video apparatus, by a video interface, which is a communication unit. The television apparatus 200 may also be connected to a game console or the like. A High-Definition Multimedia Interface (HDMI) may be used as the video interface. HDMI includes a data line for transmitting a digital video/audio signal and a bidirectional bus line for transmitting control signals (CEC commands) between apparatuses. A remote controller 100 is a pointing type remote controller, and a user issues an instruction for channel selection or input switching by pressing a specified button of the remote controller. The remote controller 100 detects the amounts and directions of the movements thereof in the up-down direction and the left-right direction, and transmits a remote control signal in accordance with the amounts and directions of the movements to a television apparatus or a video recorder. The remote controller 100 is capable of operating both of the television apparatus 200 and the video recorder 300. The television apparatus 200 or the video recorder 300, controls a cursor 400 displayed on a specified position of the display screen on the basis of the remote control signal received from the remote controller 100.

Figure 2:
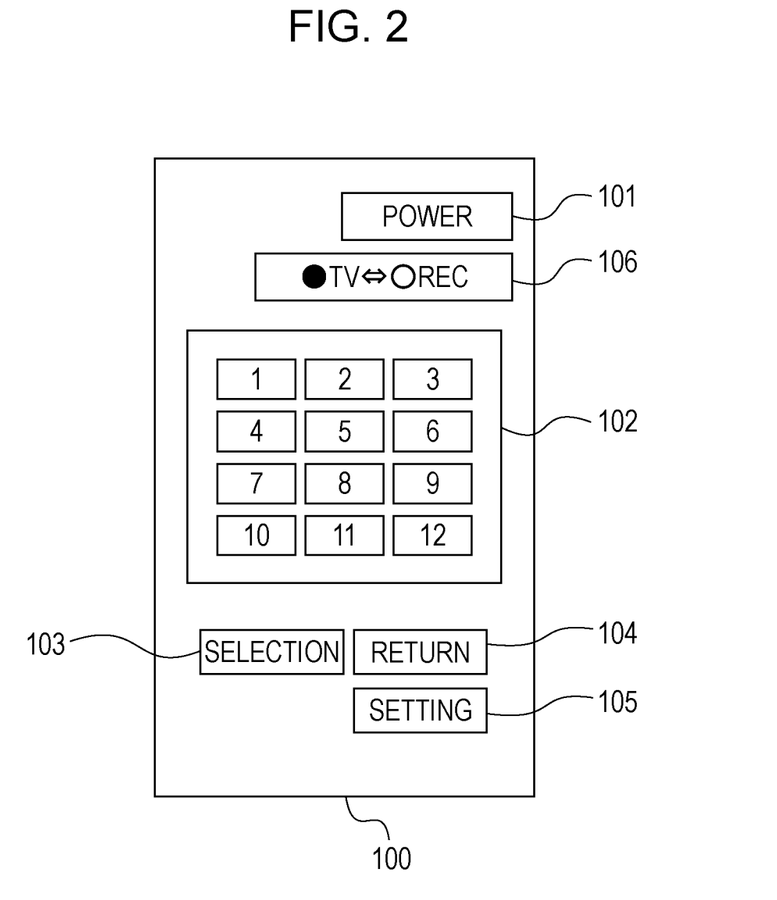
FIG. 2 illustrates an arrangement of keys of a remote controller according to the present invention.

FIG. 2 illustrates the arrangement of keys of the remote controller 100. The remote controller 100 is provided with a power key 101 for switching the power of the television apparatus 200 on or off, channel keys 102 for selecting channels, a selection key 103 for selecting the item indicated by a cursor, a return key 104 for returning a setting to its previous state, and the like.

The remote controller 100 is also provided with a setting key 105 for setting a target apparatus and a target apparatus selection key 106. A user has set the television apparatus 200 and the video recorder 300 as operation target apparatuses in advance by pressing the setting key 105. The target apparatus to be operated can be switched by pressing the target apparatus selection key 106. The target apparatus selection key 106 is selectively illuminated by using LEDs so that the selected apparatus can be identified. The operation of the remote controller 100 controls the television apparatus 200 when the television apparatus 200 has been selected ("Tv" is lit), and the video recorder when a video recorder has been selected ("Rec" is lit). Note that the target apparatus switching signal, which is a remote control signal of the target apparatus selection key 106, is simultaneously transmitted to both of the television apparatus 200 and the video recorder 300. When the television apparatus 200 receives a target apparatus switching signal for switching from the television apparatus 200 to the video recorder 300, the input of the television apparatus 200 is switched to an external video input so as to allow the video signal output from the video recorder 300 to be input. When the television apparatus 200 receives a target apparatus switching signal for switching from the video recorder 300 to the television apparatus 200, the input of the television apparatus 200 is switched from an external video input to the television apparatus 200 itself.

Figure 3:
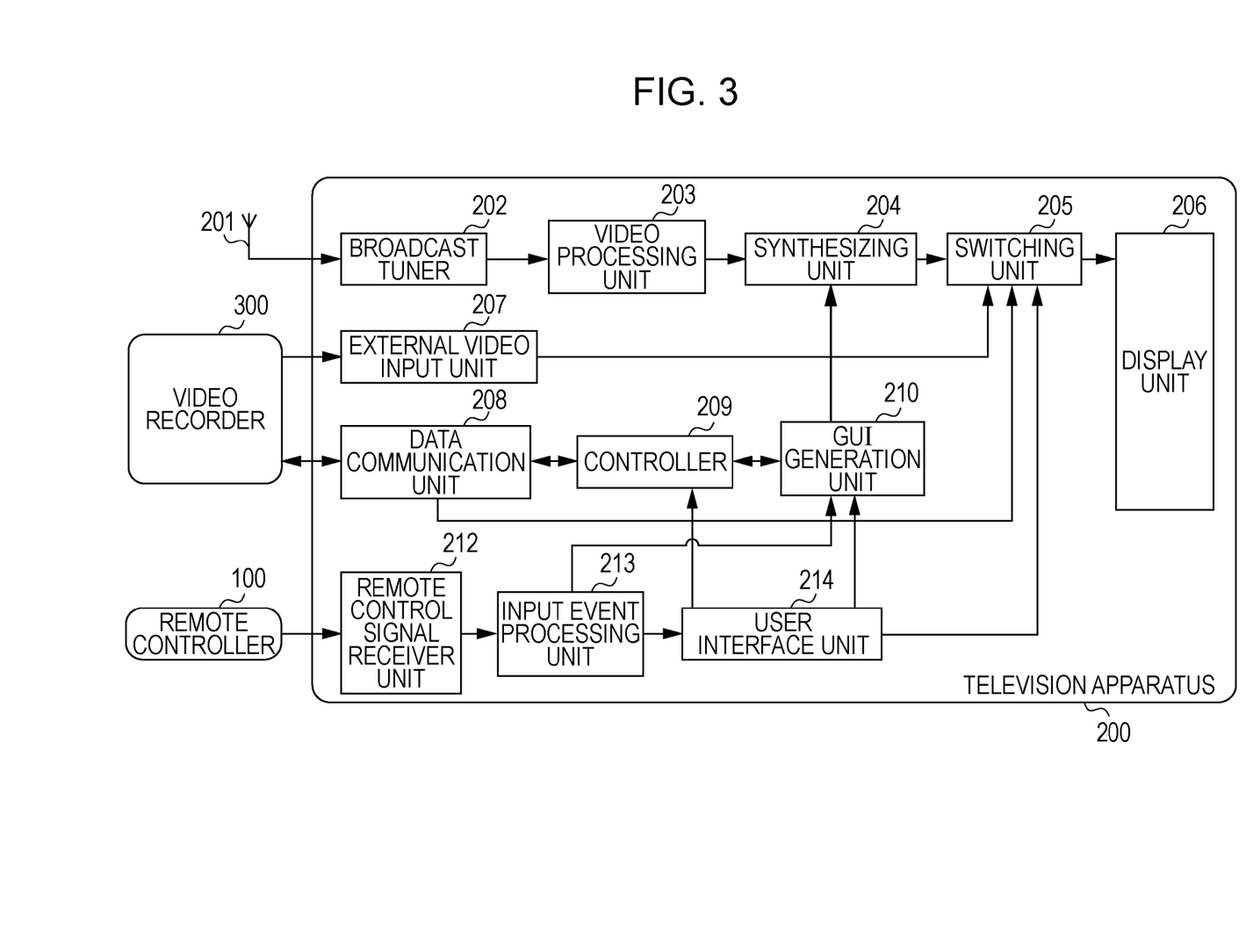
FIG. 3 is a block diagram of a television apparatus according to the present invention.

FIG. 3 is a block diagram illustrating the whole configuration of the television apparatus 200. A broadcast tuner 202 as an input unit receives a broadcast signal, which is a video source, via an antenna 201. The broadcast tuner 202 demodulates the received signal and, after performing error correction processing, generates a transport stream (TS), which is output to a video processing unit 203. The video processing unit 203 extracts video data (second video data) from the input TS and decodes the video data. Extracted audio data is decoded by an audio processing unit (not shown) and output from a loudspeaker as an audio signal. A synthesizing unit 204 combines GUI image data input from a GUI generation unit (generation unit) 210 and video data input from the video processing unit 203, and outputs the combined video data to a switching unit 205. The GUI image data is constituted by cursor image data for displaying a cursor image and graphic image data for displaying a graphic image. The switching unit 205, when an input switching signal is input from a user interface unit 214 or a data communication unit 208, selects either combined video data from the synthesizing unit 204 or external video data from an external video input unit 207, and outputs the selected data to a display unit 206. A video interface is constituted by the external video input unit 207 that receives external video data from the video recorder 300 and the data communication unit 208 that inputs television apparatus cursor position information. The data communication unit 208, when video recorder cursor position information is input from the video recorder 300, outputs the video recorder cursor position information to a controller 209, and, when an input switching signal is input, outputs the input switching signal to the switching unit 205. The controller 209, when a CPU receives an operation target switching signal from the user interface unit 214, receives the current television apparatus cursor position information from the GUI generation unit 210 and outputs the information to the data communication unit 208. The GUI generation unit 210 generates GUI image data for displaying graphic images such as a cursor image and a menu dialog on the basis of a GUI rendering signal from the user interface unit 214, and outputs the GUI image data to the synthesizing unit 204. In addition, the GUI generation unit 210 receives movement amount information used to move a cursor from an input event processing unit 213, and generates cursor image data on the basis of the movement amount information. The input event processing unit 213 analyzes a remote control signal input from a remote control signal receiver unit 212, and outputs a corresponding event signal to the user interface unit 214. Furthermore, the input event processing unit 213 outputs movement amount information included in a remote control signal to the GUI generation unit 210. The user interface unit 214, on the basis of an event signal input from the input event processing unit 213, outputs a GUI rendering signal to the GUI generation unit 210, outputs an operation target switching signal to the controller 209, and outputs an input switching signal to the switching unit 205. When an event signal corresponding to a setting menu is received, for example, the user interface unit 214 activates a setting menu function and outputs a GUI rendering signal for a setting menu to the GUI generation unit 210.

Figure 4:
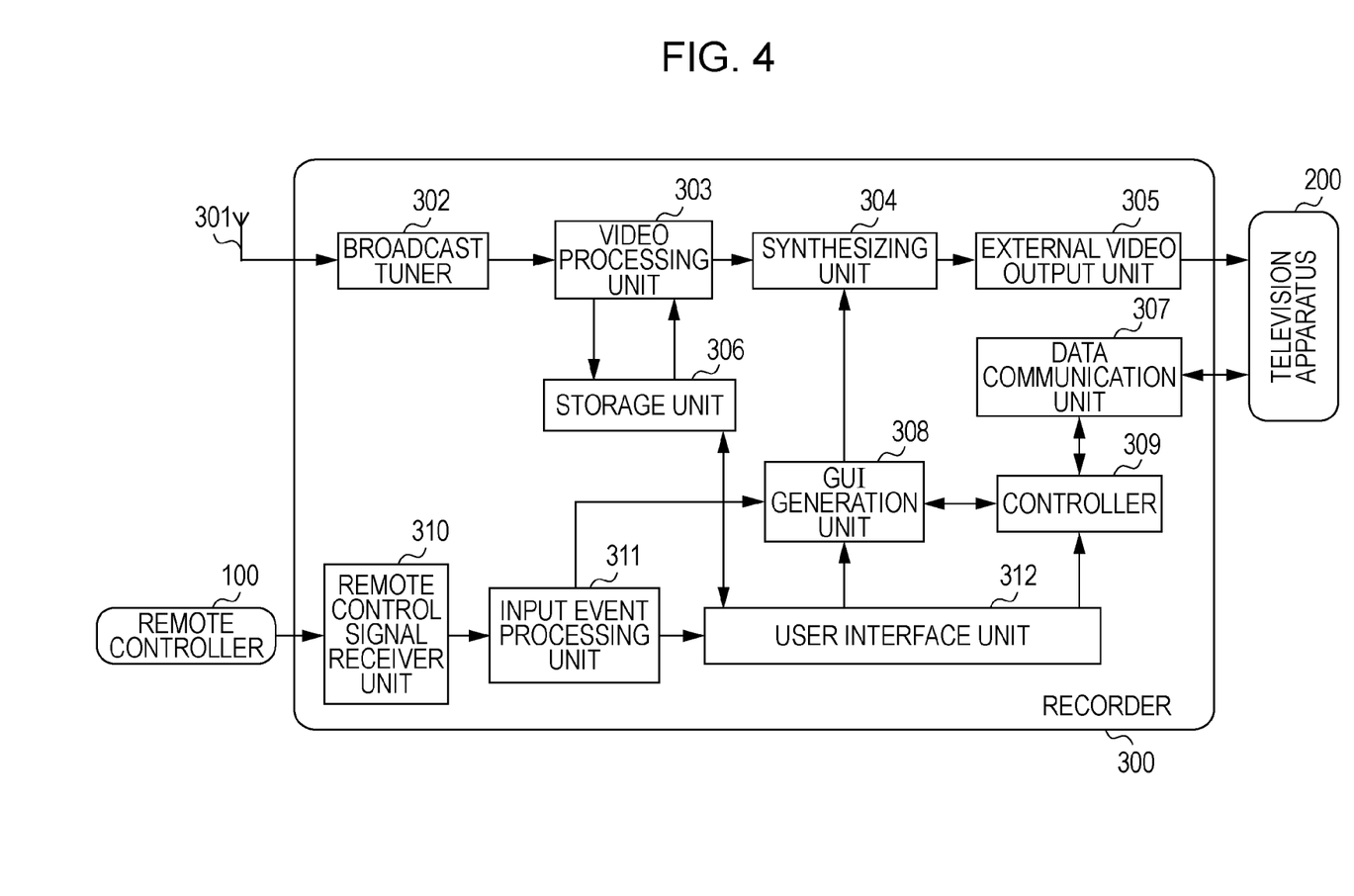
FIG. 4 is a block diagram of a video recorder according to the present invention.

Referring to FIG. 4, the configuration of the video recorder 300 will now be described. Note that the descriptions of similar operations of the same blocks as those in FIG. 3 are omitted. A storage unit 306 is a hard disk drive (HDD) or a Blu-ray Disc (registered trademark, BD). A video processing unit 303 extracts TS packets corresponding to a program of a user specified channel from a TS which is input from a broadcast tuner 302, and stores the TS packets in the storage unit 306. The TS packets corresponding to a specified program are output to the video processing unit 303 on the basis of a replayed signal from a user interface unit 312. The video processing unit 303 performs decoding processing for the TS packets input from the storage unit 306, and outputs the decoded video data to a synthesizing unit 304. An external video output unit 305 outputs the combined video data input from the synthesizing unit 304 to the television apparatus 200. A data communication unit 307 transmits video recorder cursor position information input from a controller 309 to the television apparatus 200. When television apparatus cursor position information is input from the television apparatus 200, the data communication unit 307 outputs the television apparatus cursor position information to the controller 309, and outputs, to the television apparatus 200, an input switching signal for outputting video data from the video recorder 300 to the television apparatus 200.

Figure 5:
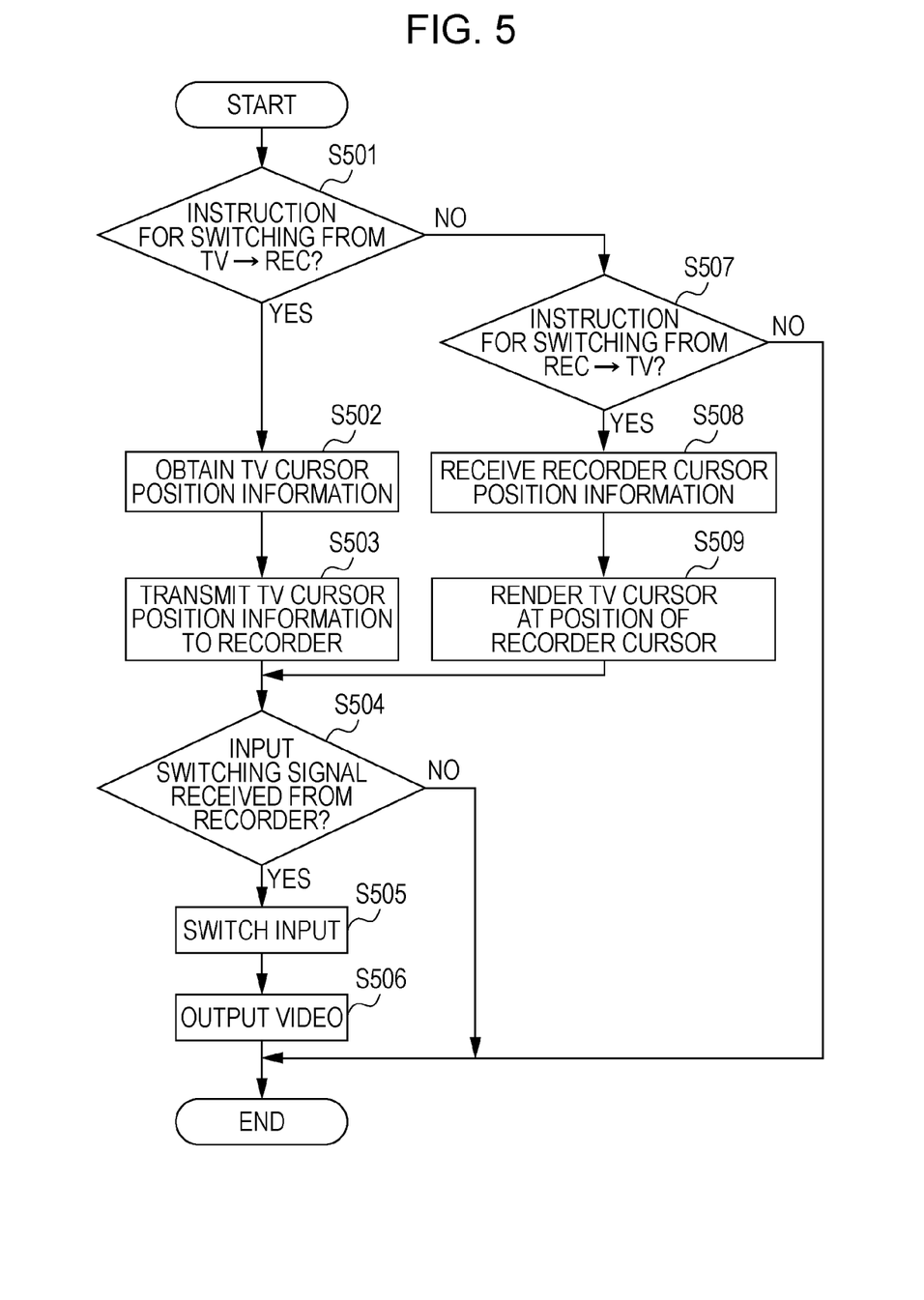
FIG. 5 is a flowchart of the operation of a television apparatus according to a first embodiment.

FIG. 5 is a flowchart illustrating the operation processing flow of the television apparatus 200 when the television apparatus 200 has received a remote control signal. Note that for simplicity a video recorder is called a recorder in the illustrated flowcharts, hereinafter. The flow starts when a user presses the target apparatus selection key 106 of the remote controller 100. The controller 209 of the television apparatus 200 determines whether or not the received remote control signal is an operation target switching signal for switching from the television apparatus 200 to the video recorder 300 (S501). When the remote control signal is an operation target switching signal for switching from the television apparatus 200 to the video recorder 300 (Yes in step S501), the controller 209 obtains television apparatus cursor position information (first position information) (S502). The controller 209 then transmits the television apparatus cursor position information from the data communication unit 208 to the video recorder 300 (S503). The controller 209 determines whether or not an input switching signal has been received from the video recorder 300 (S504). When an input switching signal has been received (Yes in S504), the switching unit 205 performs input switching (S505), and outputs video data transmitted from the video recorder 300 on the display unit 206 (S506).

When the remote control signal is not an operation target switching signal for switching from the television apparatus 200 to the video recorder 300 (No in step S501), it is determined whether or not the operation target switching signal is an operation target switching signal for switching from the video recorder 300 to the television apparatus 200 (S507). When the operation target switching signal is an operation target switching signal for switching from the video recorder 300 to the television apparatus 200 (Yes in S507), the controller 209 receives video recorder cursor position information (Xrec, Yrec) from the data communication unit 208 (S508). The controller 209 outputs the video recorder cursor position information to the GUI generation unit 210 so as to make the television apparatus cursor position the same as the video recorder cursor position (S509). The GUI generation unit 210 generates cursor image data using the cursor position information, and outputs the cursor image data to the synthesizing unit 204. When the operation target switching signal is not an operation target switching signal for switching from the video recorder 300 to the television apparatus 200 (No in step S507), the processing flow ends.

Figure 6:
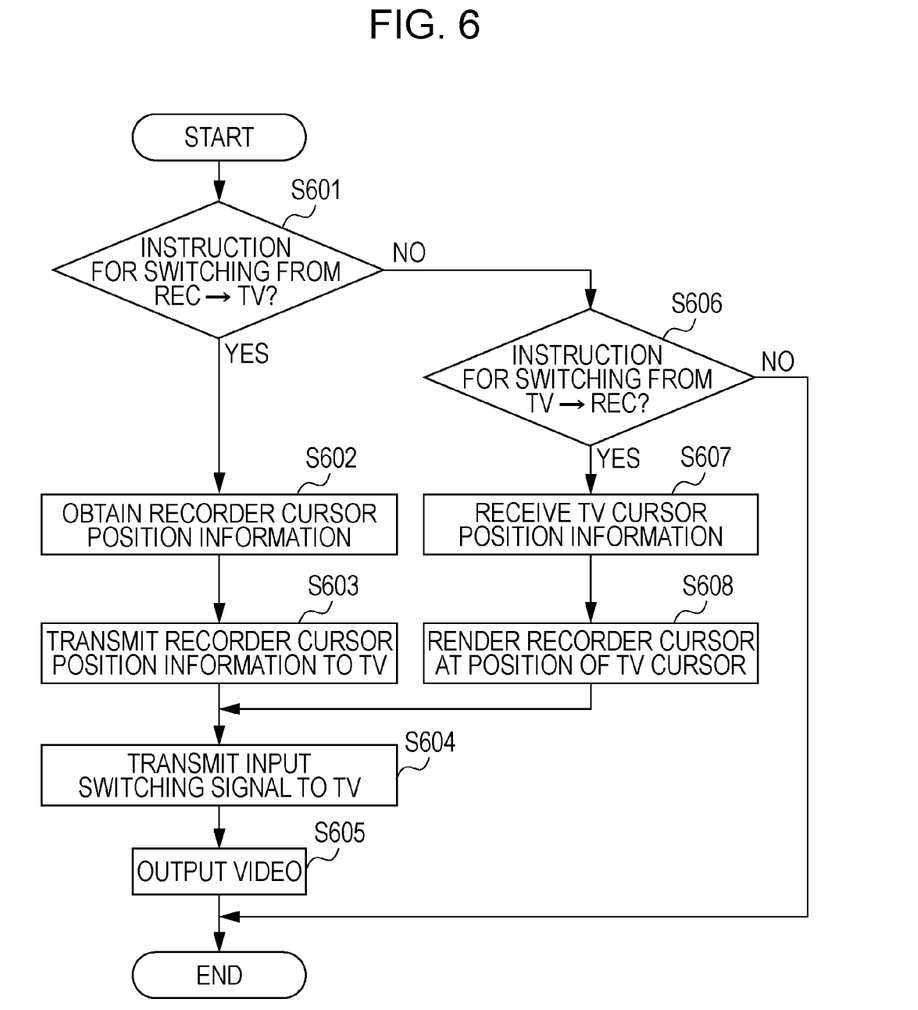
FIG. 6 is a flowchart of the operation of a video recorder according to the first embodiment.

FIG. 6 is a flowchart of the operation processing of the video recorder 300 when the video recorder 300 has received a remote control signal. The controller (CPU) 309 of the video recorder 300 determines whether or not the received remote control signal is an operation target switching signal for switching from the video recorder 300 to the television apparatus 200 (S601). When the remote control signal is an operation target switching signal for switching from the video recorder 300 to the television apparatus 200 (Yes in step S601), the controller 309 obtains the current video recorder cursor position information (Xrec, Yrec) (second position information) from a GUI generation unit 308 (S602). The obtained video recorder cursor position information is output to the data communication unit 307 by the controller 309 so as to be transmitted to the television apparatus 200 (S603).

When the remote control signal is not an operation target switching signal for switching from the video recorder 300 to the television apparatus 200 (No in step S601), the controller 309 determines whether or not the remote control signal is an operation target switching signal for switching from the television apparatus 200 to the video recorder 300 (S606). When the determination result is affirmative (Yes in S606), the controller 309 receives television apparatus cursor position information (Xtv, Ytv) from the data communication unit 307 (S607). The controller 309 outputs the television apparatus cursor position information to the GUI generation unit 308 so as to make the video recorder cursor position the same as the television apparatus cursor position (S608). The GUI generation unit 308 generates cursor image data using the television apparatus cursor position information.

When the remote control signal is not an operation target switching signal for switching from the television apparatus 200 to the video recorder 300 (No in S606), the processing flow ends.

Figure 7:
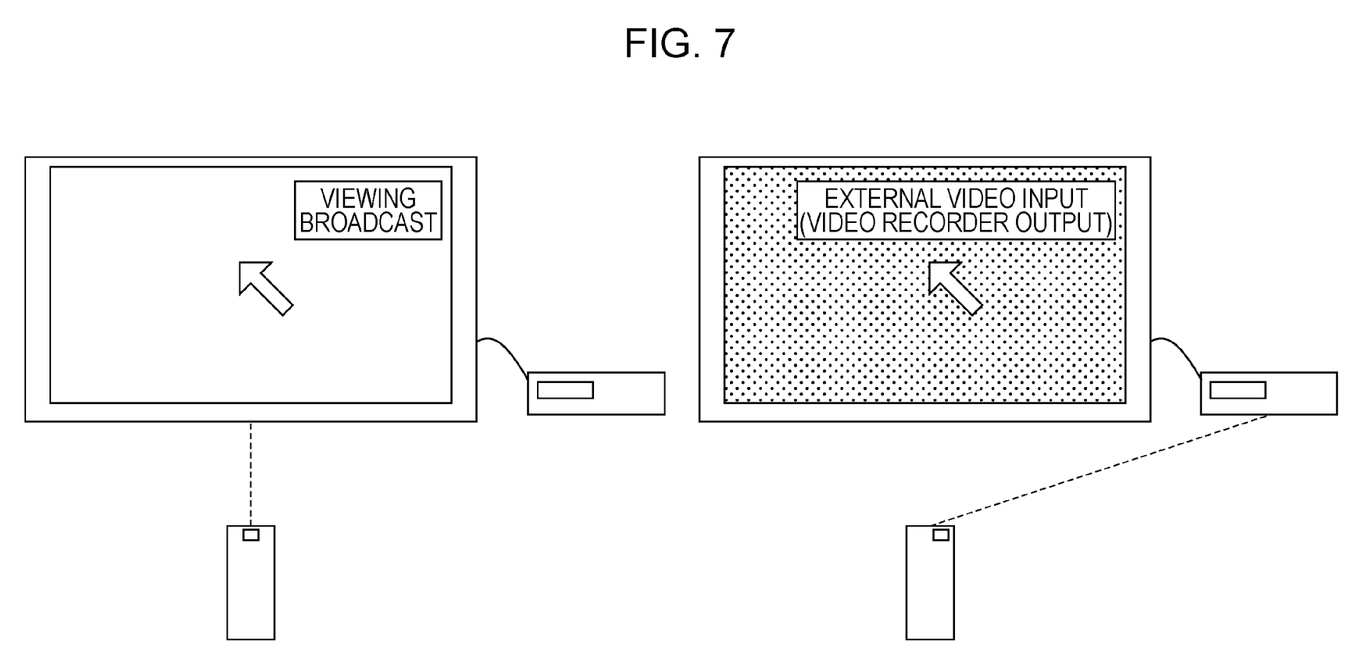
FIG. 7 is a schematic diagram illustrating the display states of a cursor according to the first embodiment.

FIG. 7 is a diagram illustrating the display states of a cursor before and after the operation target switching. The television apparatus 200 and the video recorder 300 are controlled together such that the display position of a cursor remains the same before and after the switching operation from the television apparatus 200 to the video recorder 300.

Second Embodiment

In a second embodiment, when GUIs are being displayed which are selectable with a cursor controlled by an apparatus to which an operation target is to be switched, the cursor is displayed so as to be superimposed on the GUI which is closest to the position of a cursor which has been displayed before the switching of an operation target.

A GUI position holding unit A (not shown) is added to the configuration blocks of the television apparatus 200 illustrated in FIG. 3. The GUI position holding unit A is connected to the controller 209 and the GUI generation unit 210. The GUI position holding unit A holds position information, required for rendering GUIs, in the form of coordinates and a size (width W and height H), and outputs the position information of a specified GUI to the GUI generation unit 210. The position information of a GUI is held in the form of the coordinates of the top left corner of a displayed region (Xgui, Ygui) and the size of the GUI (Wgui, Hgui). The GUI position holding unit A outputs the position information of the currently displayed GUI to the controller 209 in accordance with an instruction from the controller 209. The controller 209, upon receipt of the video recorder cursor position information (Xrec, Yrec) for the video recorder 300 from the data communication unit 208, obtains the position information of the current GUI from the GUI position holding unit A. The controller 209 determines the position of a television apparatus cursor to be displayed by the television apparatus 200 on the basis of the GUI position information and the video recorder cursor position information, and outputs the television apparatus cursor position information (Xtv, Ytv) to the GUI generation unit 210.

A GUI position holding unit B (not shown) is added to the configuration blocks of the video recorder 300 illustrated in FIG. 4. The GUI position holding unit B, similarly to the GUI position holding unit A of the television apparatus 200, holds position information, required for rendering GUIs, in the form of coordinates and a size (width W and height H). The controller 309, upon receipt of television apparatus cursor position information from the data communication unit 307, obtains the position information of the current GUI from the GUI position holding unit B. The controller 309 determines the position of a video recorder cursor to be displayed by the video recorder 300 on the basis of the GUI position information and the video recorder cursor position information, and outputs the video recorder cursor position information to the GUI generation unit 308.

Figure 8:
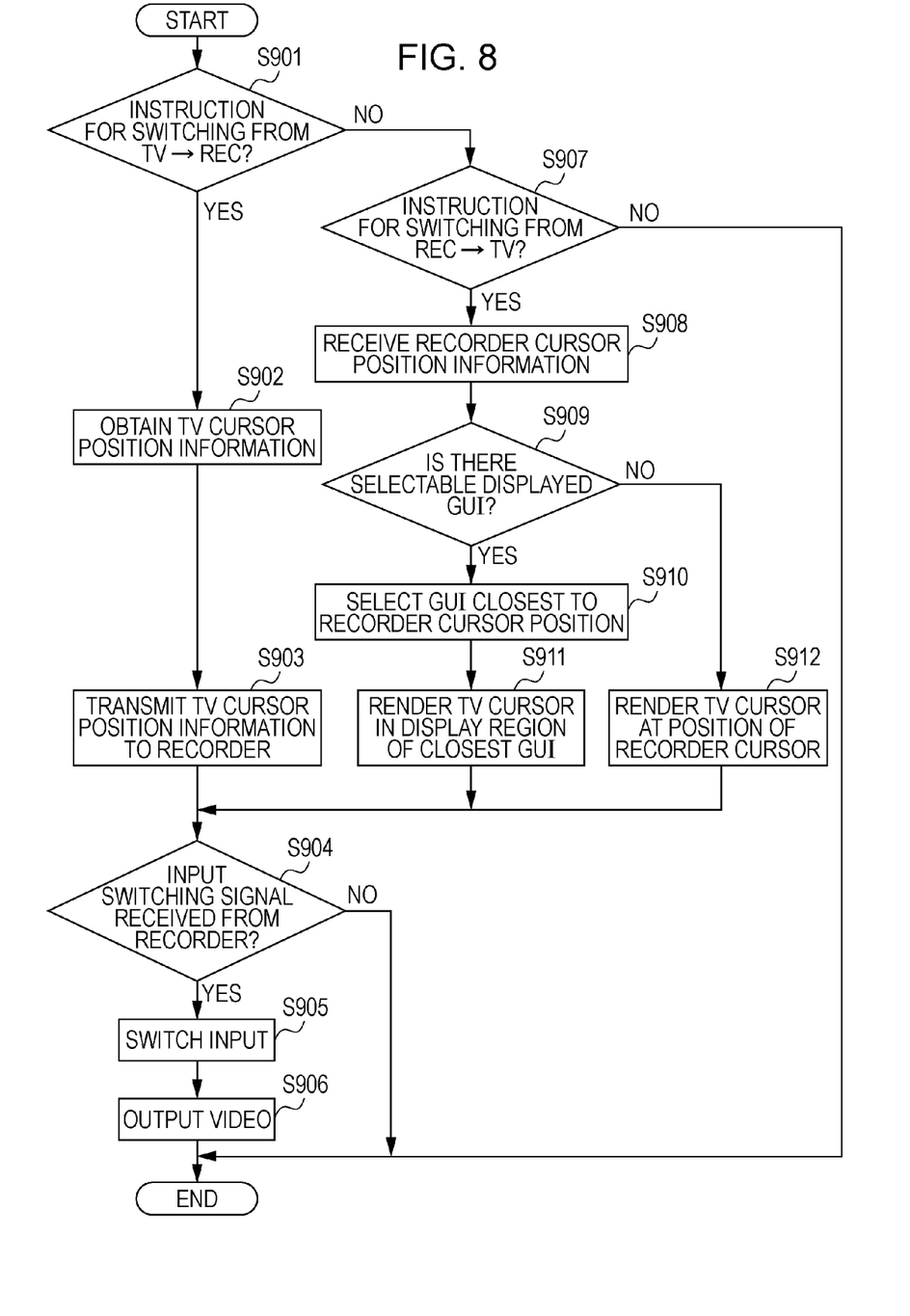
FIG. 8 is a flowchart of the operation of a television apparatus according to a second embodiment.

FIG. 8 is a flowchart illustrating the operation processing flow of the television apparatus 200 when the television apparatus 200 has received a remote control signal. The initial operation target of the remote controller 100 is the television apparatus 200. The flow starts when a user pressed the target apparatus selection key 106 of the remote controller 100. The controller 209 of the television apparatus 200 determines whether or not a received remote control signal is an operation target switching signal for switching from the television apparatus 200 to the video recorder 300 (S901). Since the processing performed when the received remote control signal is an operation target switching signal for switching from the television apparatus 200 to the video recorder 300 (Yes in step 5901) is the same as that of the first embodiment illustrated in FIG. 5, the description thereof is omitted.

When the remote control signal is not an operation target switching signal from the television apparatus 200 to the video recorder 300 (No in step S901), it is determined whether or not the operation target switching signal is an operation target switching signal for switching from the video recorder 300 to the television apparatus 200 (S907). When the operation target switching signal is not an operation target switching signal for switching from the video recorder 300 to the television apparatus 200 (No in S907), the processing flow ends. When the operation target switching signal is an operation target switching signal for switching from the video recorder 300 to the television apparatus 200 (Yes in S907), the controller 209 receives video recorder cursor position information (Xrec, Yrec) from the data communication unit 208 (S908). The controller 209, after obtaining the video recorder cursor position information, asks the GUI position holding unit A whether or not there is any currently displayed GUI (S909). When there is at least one currently displayed GUI (Yes in step S909), the currently displayed GUI is selected if this is the only GUI being displayed, and if there is more than one GUI being displayed, the GUI closest to the video recorder cursor position is selected. Here, the distance between the center of the GUI display region and the video recorder cursor position is used as the distance between the GUI and the video recorder cursor position. In the case of a GUI having a rectangular shape with the top left coordinates (Xa, Ya) and an area of width Wa and height Ha, the center position (Xmid, Ymid) of the GUI is given by the following equation.

$$(Xmid, Ymid) = (Xa + (Wa/2), Ya + (Ha/2))$$

The distance between the video recorder cursor position and the center position of the GUI is given by the following equation.

$$L = \sqrt{(Xmid - Xrec)^2 + (Ymid - Yrec)^2}$$

The controller 209 selects, from among a plurality of GUI display regions, the GUI that has the minimum distance Lmin from the video recorder cursor position (S910). The controller 209 displays a television apparatus cursor in the display region of the selected GUI (S911). For instance, the controller 209 outputs television apparatus cursor position information (Xtv, Ytv) to the GUI generation unit 210, where Xtv=Xa+(Wa/2) and Ytv=Ya+(Ha/2), so that the television apparatus cursor is positioned at the center of the GUI display region.

On the other hand, when there is not a currently displayed GUI (No in step S909), the controller 209 outputs the video recorder cursor position information to the GUI generation unit 210. The GUI generation unit 210 displays a television apparatus cursor such that the television apparatus cursor position is the same as the video recorder cursor position, using the video recorder cursor position information (S912).

Figure 9:
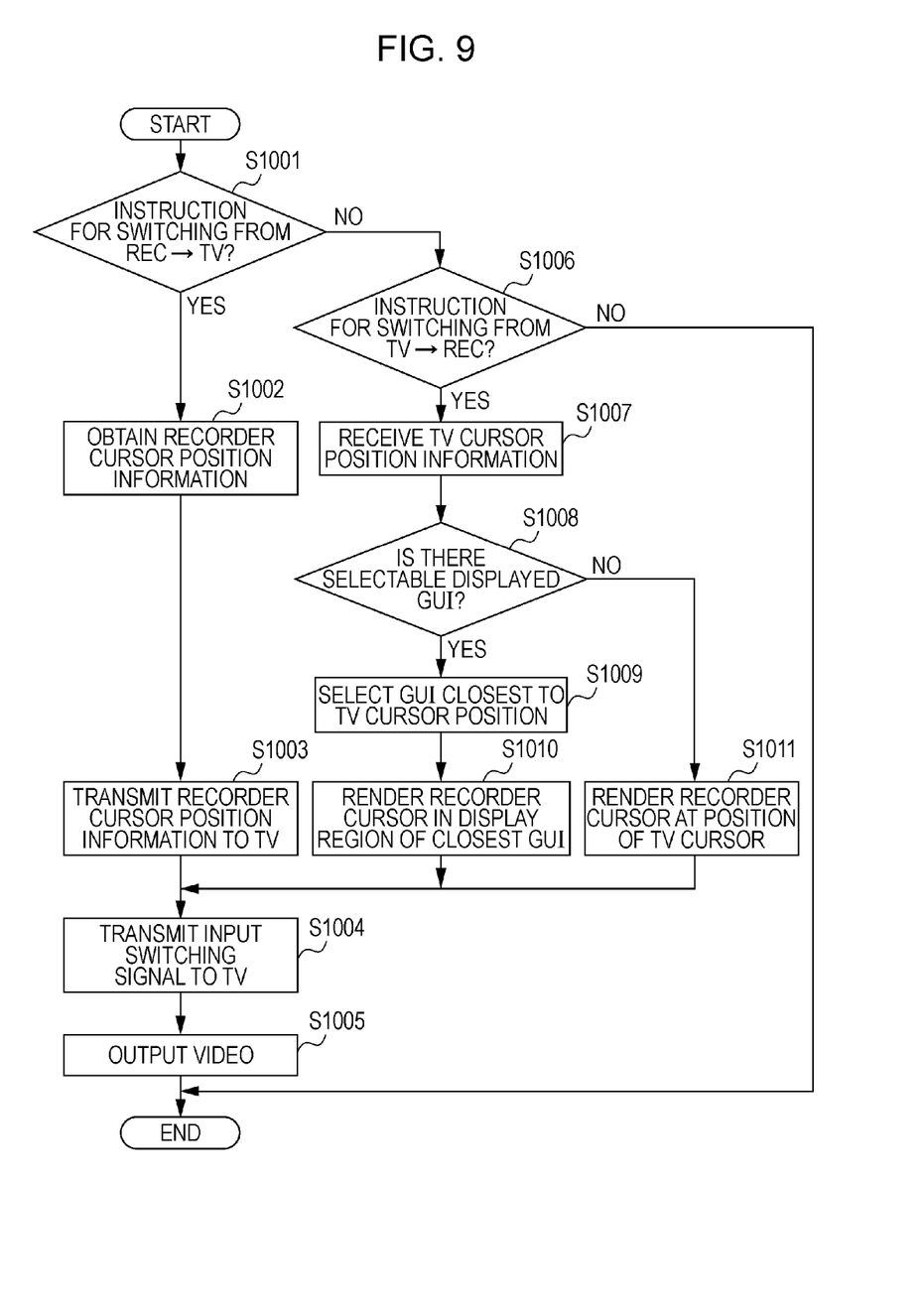
FIG. 9 is a flowchart of the operation of a video recorder according to the second embodiment.

FIG. 9 is a flowchart illustrating the operation processing flow of the video recorder 300 when the video recorder 300 has received a remote control signal. The controller 309 of the video recorder 300 determines whether or not the received remote control signal is an operation target switching signal for switching from the video recorder 300 to the television apparatus 200 (S1001). The operation flow performed when the received remote control signal is an operation target switching signal for switching from the video recorder 300 to the television apparatus 200 (Yes in step S1001) is the same as that of the first embodiment illustrated in FIG. 6, and the description thereof is omitted. When the received remote control signal is not an operation target switching signal for switching from the video recorder 300 to the television apparatus 200 (No in step S1001), the controller 309 determines whether or not the remote control signal is an operation target switching signal for switching from the television apparatus 200 to the video recorder 300 (S1006). When the remote control signal is not an operation target switching signal for switching from the television apparatus 200 to the video recorder 300 (No in step S1006), the processing flow ends.

When the remote control signal is an operation target switching signal for switching from the television apparatus 200 to the video recorder 300 (Yes in step S1006), the controller 309 receives television apparatus cursor position information from the data communication unit 307 (S1007). The controller 309, after obtaining the television apparatus cursor position information, asks the GUI position holding unit B whether or not there is any currently displayed GUI (S1008). When there is at least one currently displayed GUI (Yes in step S1008), the currently displayed GUI is selected if this is the only GUI being displayed, and if there is more than one GUI being displayed, the GUI closest to the television apparatus cursor position is selected (S1009). The controller 309 displays a video recorder cursor in the display region of the selected GUI. For instance, the controller 309 outputs to the GUI generation unit 308 such video recorder cursor position information that causes the video recorder cursor to be positioned at the center of the GUI display region (S1010). When there is not a currently displayed GUI (No in step S1008), the controller 309 outputs the television apparatus cursor position information to the GUI generation unit 308. The GUI generation unit 308 displays a video recorder cursor such that the video recorder cursor position is the same as the television apparatus cursor position, using the television apparatus cursor position information (S1011).

Figure 10:
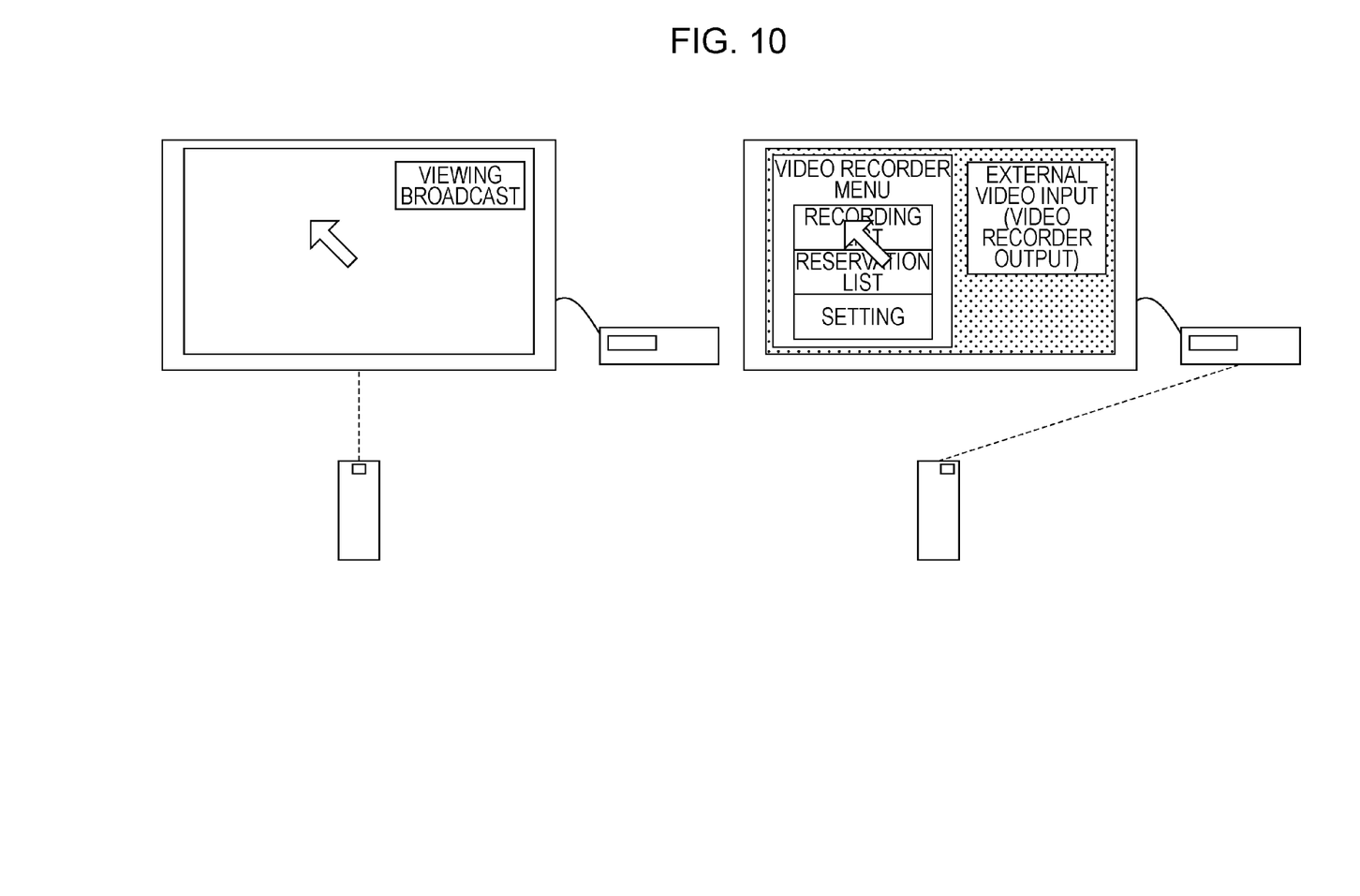
FIG. 10 is a schematic diagram illustrating the display states of a cursor according to the second embodiment.

FIG. 10 is a diagram illustrating the display states of a cursor before and after the operation target switching. When switching is performed from the screen of the television apparatus 200 to the video screen of the video recorder 300 or vice versa, a cursor can be displayed in such a manner as to be close to the position of a cursor displayed before the switching and superimposed on a GUI (video recorder menu) displayed after the switching.

Another embodiment may be configured to display, when a cursor after the input switching is rendered so as to be superimposed on a GUI, the path of the cursor moved from a cursor position corresponding to the cursor position before the switching to the final cursor position within the GUI display region.

According to the above-described embodiments, when input switching is performed among a plurality of operation target apparatuses that can be operated using a pointing type remote controller, respective cursors before and after the input switching are displayed at positions which are associated with each other (for example, at the same position). Hence, a user can operate the apparatuses in a user-friendly manner without temporarily being unable to find a cursor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-094098 filed Apr. 8, 2009, which is hereby incorporated by reference herein in its entirety.

What is claimed is:

1. A video processing apparatus connected via a communication unit to an external video apparatus operable using a pointing type remote controller, the video processing apparatus being operable using the pointing type remote controller, the video processing apparatus comprising:
   a first input unit configured to input first video data output from the external video apparatus;
   a second input unit configured to input second video data output from a video source not including the external video apparatus;

a generation unit configured to generate second cursor image data for displaying a cursor image at a specified position on a display screen of a display unit in accordance with an operation of the pointing type remote controller only when an output unit outputs the second video data to the display unit;

a synthesizing unit configured to synthesize the second video data inputted by the second input unit with the second cursor image data generated by the generation unit, and output to the display unit the second video data synthesized with the second cursor image data;

a switching unit configured to switch output data being outputted to a display unit between the first video data inputted by the first input unit and the second video data synthesized with the second cursor image data; and a controller configured to, in response to a first switching designation to switch the output data from the second video data synthesized with the second cursor image data to the first video data, (1) transmit first position information regarding the specified position of the cursor image to the external video apparatus via the communication unit, and (2) control the switching unit to switch the output data from the second video data synthesized with the second cursor image data to the first video data synthesized with first cursor image data generated by the external video apparatus on the basis of the first position information.

2. The video processing apparatus according to claim 1, wherein in response to a second switching designation to switch the output data from the first video data synthesized with the first cursor image data generated by the external video apparatus to the second video data, the controller receives second position information from the external video apparatus regarding a display position of the cursor image that has been displayed before the switching, and the generation unit generates the second cursor image data on the basis of the second position information.

3. The video processing apparatus according to claim 1, wherein the display position of the cursor image that has been displayed before the switching is the same as a display position of the cursor image displayed after the switching.

4. The video processing apparatus according to claim 1,
wherein the generation unit generates graphic image data, and wherein in response to a second switching designation to switch the output data from the first video data synthesized with the first cursor image data generated by the external video apparatus to the second video data, the generation unit generates the second cursor image data on the basis of the second position information and the graphic image data such that a display position of the cursor image displayed on the basis of the second cursor image data is within a display region of a graphic image that is displayed on the basis of the graphic image data.

5. The video processing apparatus according to claim 4, wherein when the graphic image is one of a plurality of displayed graphic images, the cursor image displayed on the basis of the second cursor image data is displayed in a display region of the displayed graphic image that is closest to the cursor image that has been displayed before the output data is switched.

6. A method of controlling a video processing apparatus connected via a communication unit to an external video apparatus operable using a pointing type remote controller, the video processing apparatus being operable using the pointing type remote controller, the method comprising:

inputting, by a first input unit, first video data output from the external video apparatus;

inputting, by a second input unit, second video data output from a video source not including the external video apparatus;

generating second cursor image data for displaying a cursor image at a specified position on a display screen of a display unit in accordance with an operation of the pointing type remote controller only when an output unit outputs the second video data to the display unit;

synthesizing the second video data inputted by the second input unit with the second cursor image data generated by the generating step, and outputting to the display unit the second video data synthesized with the second cursor image data;

switching output data being outputted to a display unit between the first video data inputted by the first input unit and the second video data synthesized with the second cursor image data; and in response to a first switching designation to switch the output data from the second video data synthesized with the second cursor image data to the first video data, (1) transmitting first position information regarding the specified position of the cursor image to the external video apparatus via the communication unit, and (2) controlling the switching step to switch the output data from the second video data synthesized with the second cursor image data to the first video data synthesized with first cursor image data generated by the external video apparatus on the basis of the first position information.

7. The method of controlling a video processing apparatus according to claim 6,
wherein in response to a second switching designation to switch the output data from the first video data synthesized with the first cursor image data generated by the external video apparatus to the second video data, receiving second position information from the external video apparatus regarding a display position of the cursor image that has been displayed before the switching, and generating the second cursor image data on the basis of the second position information.

8. The method of controlling a video processing apparatus according to claim 6, wherein the display position of the cursor image that has been displayed before the switching is the same as a display position of the cursor image displayed after the switching.

9. The method of controlling a video processing apparatus according to claim 6,
wherein the generating step generates graphic image data, and wherein in response to a second switching designation to switch the output data from the first video data synthesized with the first cursor image data generated by the external video apparatus to the second video data, generating the second cursor image data on the basis of the second position information and the graphic image data such that a display position of the cursor image displayed on the basis of the second cursor image data is within a display region of a graphic image that is displayed on the basis of the graphic image data.

10. The method of controlling a video processing apparatus according to claim 9, wherein when the graphic image is one of a plurality of displayed graphic images, the cursor image displayed on the basis of the second cursor image data is displayed in a display region of the displayed graphic image that is closest to the cursor image that has been displayed before the output data is switched.

* * * * *